United States Patent [19]

Warde et al.

[11] 3,935,027
[45] Jan. 27, 1976

[54] OXYGEN-REDUCTION ELECTROCATALYSTS FOR ELECTRODES

[75] Inventors: Charles J. Warde; Albert D. Glasser, both of Pittsburgh, Pa.

[73] Assignee: Westinghouse Electric Corporation, Pittsburgh, Pa.

[22] Filed: Apr. 9, 1975

[21] Appl. No.: 566,491

[52] U.S. Cl........ 136/86 A; 136/86 D; 136/120 FC; 204/291
[51] Int. Cl.². H01M 4/58; H01M 4/86; H01M 8/00
[58] Field of Search.......... 136/86 D, 86 R, 120 FC, 136/86 A; 204/291

[56] References Cited
UNITED STATES PATENTS

| | | | |
|---|---|---|---|
| 3,530,006 | 9/1970 | Mabishima et al. | 136/86 D |
| 3,533,849 | 10/1970 | Mitoff | 136/86 D |
| 3,644,147 | 2/1972 | Young | 136/86 D |
| 3,649,361 | 3/1972 | Raynter et al. | 136/86 D |
| 3,737,344 | 6/1973 | Benda | 136/86 D |

Primary Examiner—John H. Mack
Assistant Examiner—H. A. Feeley
Attorney, Agent, or Firm—D. P. Cillo

[57] ABSTRACT

Gas electrodes which contain a hydrophilic layer are disclosed. The hydrophilic layer is adapted to provide a gas-liquid interface therein; and includes an oxygen absorption/reduction material selected from the group consisting of $CaMnO_3$ and $Ca_{(1-x-z)}MnO_3:Na_x,Y_z$ and a current collector. A hydrophobic layer can then be laminated to the hydrophilic layer.

10 Claims, 4 Drawing Figures

3,935,027

OXYGEN-REDUCTION ELECTROCATALYSTS FOR ELECTRODES

BACKGROUND OF THE INVENTION

Air or oxygen depolarization cells are well known in the art. Electrochemical cells of this type include a gas diffusion cathode capable of generating electricity. Generally, these electrochemical cells are comprised of spaced apart electrodes ionically connected by an electrolyte.

Until recently, metal/air cells were not suitable for applications in which a rapid discharge was required. Presently, however, metal/air cells are capable of achieving high energy to density ratios, making them useful in rapid discharge applications such as light weight intra-urban vehicles.

The air electrodes utilized in present state-of-the-art metal/air cells, however, are generally unifunctional; that is, they are incapable of electrochemically regenerating the fuel electrode. Therefore, in order to recharge the battery, a third, counter-electrode is required. Since the counter-electrode is used only during the recharging cycle and the air electrode only during discharge, the cell requires a complicated geometric design, as well as complex mechanical or electrical switching means. Additionally, the use of a counter-electrode increases the dead weight of the cell, and reduces the cell voltage, resulting in a deterioration of the capacity of the metal electrode on extended cycling.

Accordingly, it is an object of the present invention to provide an improved electrode for use in hydrogen-/oxygen fuel cells, and particularly, a bifunctional air electrode for use in metal/air cells that undergo substantial charge-discharge cycling. It is a further object of the invention to provide, as the preferred embodiment a bifunctional air electrode which not only eliminates the need for a counter-electrode, but which has a long cycling life, stability, high energy capacity, and low cost.

From an analysis of the reactions associated with oxygen reduction and evolution, four different categories of active components are necessary in a useful bifunctional air electrode: (1) a conductive support; (2) an oxygen absorption/reduction electrocatalyst, generally a carbon material; (3) a catalyst for perhydroxide ion decomposition and (4) an electrocatalyst for oxygen evolution. Ideally one or several materials could perform all of these functions.

Presently, the carbon used as the oxygen absorption/reduction electrocatalyst is the weak component in bifunctional air electrodes. At the high potentials associated with oxygen evolution, the active sites of the carbon are unstable. This instability is considered to be a major contributor to the observed performance degradation of carbon type bifunctional air electrodes on cycling. In order to provide improved bifunctional air electrodes, low cost substitute oxygen absorption/reduction electrocatalysts must be found, preferably one which could also provide other catalytic functions.

The ideal oxygen absorption/reduction electrocatalyst for use in the air electrode of a metal/air battery will have the following properties:

1. Stability between +750 mV and −300 mV (relative to Hg/HgO) in 25 wt.% KOH in the temperature range 0°–70°C.
2. Electrical resistivity of less than 1000 ohm–cm.
3. Negligible contact resistance between the conductive support and the electrocatalyst in 25 wt.% KOH.
4. Capability of delivering 50 mA cm$^{-2}$ at −150 mV (relative to Hg/HgO) in a fully optimized electrode structure for 1000 charge-discharge cycles.

The current price of gold and platinum, which are active in the pure or alloyed state, rule out their large scale use in commercial metal/air batteries. Strontium-doped lanthanum cobaltite $LaCoO_3$:Sr was the first material to indicate the feasibility of economical substitution for carbon in air electrodes. This material however does not fulfill condition 3 above, in that activity is present in this material only in sintered plaque form. Other perovskites, such as $LaMnO_3$:Sr and $LaNiO_3$:Sr have proved to be ineffective. The oxygen/reduction properties of spinels, for example, $CoFe_2O_4$, $CoAl_2O_4$, $NiCo_2O_4$ and $NiFe_2O_4$, does not suggest that these compounds are strong candidates for use in the air electrodes of metal/air batteries. What is needed then is a new, highly-active, effective electrocatalyst, preferably one that will be inexpensive.

FIELD OF THE INVENTION

The present invention relates to improved air electrodes for use in hydrogen/oxygen fuel cells, and particularly, bifunctional air electrodes for metal/air cells and batteries.

SUMMARY OF THE INVENTION

The present invention substitutes effective amounts of an oxygen absorption/reduction electrocatalyst material selected from $CaMnO_3$ and $Ca_{(1-x-z)}MnO_3$:$Na_x,Y_z$ for carbon and the other catalysts, in the hydrophilic composite comprising the hydrophilic layer in an electrode; for use in hydrogen/oxygen fuel cells and in metal/air cells, particularly iron/air cells. Because of the inexpensiveness of the precursors, i.e. $CaCO_3$ and $MnO_2$, these compounds are low-cost electrocatalysts.

BRIEF DESCRIPTION OF THE DRAWINGS

For a better understanding of the invention reference may be made to the preferred embodiments, exemplary of the invention, shown in the accompanying drawings, in which.

DESCRIPTION OF THE PREFERRED EMBODIMENTS

Figure 1:
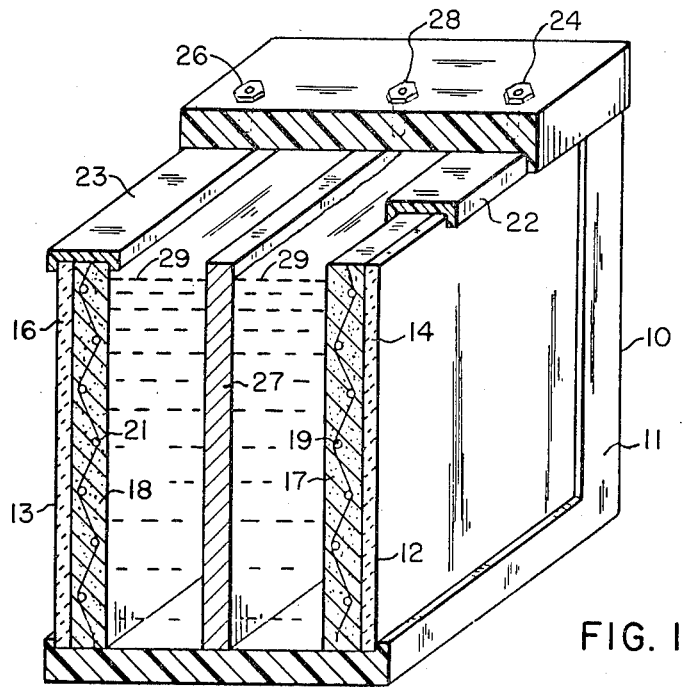
FIG. 1 is an isometric view, in partial section, of one embodiment of an air/metal battery of the present invention.

The electrode of the present invention includes a hydrophilic layer, comprising an expanded metal, wire screen, or metal fiber current collector inert to electrolyte and preferably fabricated from nickel, or nickel plated steel, integrally molded into or otherwise attached to a hydrophilic composite material. The hydrophilic layer can then be laminated or otherwise attached to a hydrophobic layer. The laminated composite electrode may then be suitably framed in a material that is corrosion resistant to alkaline electrolyte, such as a styrene-butadiene-acrylonitrile plastic. The electrode is positioned within the cell so that the hydrophobic material is in contact with a source of oxygen, and the hydrophilic material is in contact with an alkali hydroxide electrolyte solution, such as aqueous NaOH, KOH or LiOH.

The electrode of this invention will be described primarily with respect to its preferred use as a bifunctional electrode in an iron/air battery. It is to be understood, however, that it can also be used in other metal-/air cells and batteries and as the cathode in a fuel cell. Preferably, the hydrophilic layer of the air electrode is fabricated from a composite into which the current collector is press molded. The hydrophilic composite for the bifunctional electrode into which the current collector is molded may comprise four components. The first component which may be utilized in the hydrophilic composite for the bifunctional electrode provides a low oxygen overvoltage, that is, decreases oxygen overvoltage. It, is also believed to aid in reducing oxygen reduction products as well as acting as a catalyst for the decomposition of perhydroxide. Compounds found suitable for use as the first component include tungsten disulfide, tungsten carbide, and tungsten carbide containing about 1–20 Wt.% but preferably 10–15 Wt.% fused cobalt. In this latter material, the cobalt is generally fuse sintered onto tungsten carbide particles. This first component is not necessary in the fuel cell electrode embodiment of this invention, and is optional but preferred in the metal/air cell and metal-/air battery embodiment of this invention.

The second component is a non-wetting binding agent, which helps to prevent gross flooding of the electrode by the electrolyte. It is effective to provide a gas-liquid interface within the hydrophilic layer. It preferably comprises a blend of fibrillated polytetrafluoroethylene and particulate fluorinated ethylene propylene. The third component, which is a catalyst, such as silver, or silver-mercury alloy, which is effective for the reduction of oxygen and the decomposition of intermediate reaction products, typically perhydroxides may be optionally added.

The fourth and essential component is an oxygen absorption and reduction electrocatalyst material selected from the group of undoped $CaMnO_3$, and calcium manganite containing sodium and yttrium having the formula $Na_xY_z Ca_{[1-(x+z)]}MnO_3$ or $Ca_{(1-x-z)}Na_x Y_z MnO_3$, where $x$ and $z$ can range from about 0.05 to 0.40. These electrocatalysts have a surface area of between about 0.5 to about 200 sq. meters/gram, with a preferred range of between about 1 to 200 sq. meters/gram, and consist of discrete particles having a particle size between about 0.005–0.13 microns approximate diameter. Surface areas below 0.5 sq. meters/gram, while providing some electrical output, would not provide the type of electrical output necessary for fuel cells or metal/air batteries. Surface areas above 200 sq. meters/gram would provide particles below about 0.005 microns and involve a multitude of fabrication mixing and pasting problems.

These calcium manganites and sodium and yttrium doped calcium manganites are very low cost substitutes for carbon, and are also effective to reduce the amount of or eliminate catalysts such as Ag and WC in the electrode. They also meet the requirements of stability in KOH, high capacity over long charge-discharge cycles, low electrical resistivity, and low contact resistance with suitable electrode support materials. The calcium manganites can generally be made by room temperature grinding and pressing of high purity $CaCO_3$ and high purity $MnO_2$, followed by sintering in a platinum crucible. The sintering is carried out in a pure oxygen atmosphere, at temperatures between about 1250°C to 1350°C, for a time effective to cause complete reaction to $CaMnO_3$, and may require several grinding, pressing and sintering cycles. This method produces $CaMnO_3$ of relatively large particle size and low surface area and is not to be considered in any way limiting, since high surface area manganites are highly desirable.

The use of a pure oxygen atmosphere to promote stability of the +4 oxidation state of manganese, ensured that the reactants and products would be bathed in an atmosphere containing $PtO_2$, which is stable in the gaseous state at these temperatures. Emission spectroscopy and mass spectrographic analysis generally showed impurities of Al at about 40 ppm, La at about 30 ppm and Pt at less than 1 ppm. Another method of making the $CaMnO_3$ would be by oxidizing calcium-manganese-cyanide complex precursor materials. This would produce $CaMnO_3$ materials with surface areas of about 4–20 sq. meters/gram.

Replacement of 10% to 80% of the calcium +2 ions in the $CaMnO_3$, by 5% to 40% each of sodium +1 ions and yttrium +3 ions, results in a very useful oxygen absorption and reduction $CaNaYMnO_3$ electrocatalyst. The replacement can be accomplished by mixing $CaCO_3$, $MnO_2$, effective amounts of a sodium compound such as $Na_2CO_3$ and effective amounts of a yttrium compound such as $Y_2(CO_3)$; pressing at room temperature and initially sintering at 700°C to 800°C, to decompose the sodium carbonate and stabilize sodium in the $CaMnO_3$ lattice, followed by room temperature grinding and resintering at about 1100°C. The composition of these materials can be easily determined by X-ray powder photography. The Na and Y are added in amounts effective to substitute for a total of 10% to 80% of the Ca, the Mn +4 ions being left in their place in the lattice structure.

Generally, the manganite materials formed should have a small particle size and large surface area, so that they are highly active. They must also be homogeneously mixed with the other components of the hydrophilic composite, to provide a material with intimate contact of all the components with each other and the current collector.

These four components for the hydrophilic composite for the electrode are mixed together in a ratio of: about 1 part by weight oxygen absorption/reduction electrocatalyst; 0–1.5 parts but preferably 0.1–1 part by weight WC, $WS_2$ or WC with 1–20 Wt.% Co.; an amount of non-wetting binding agent or other material effective to bond the other components together, prevent electrolyte flooding, and provide a gas-liquid interface, usually about 0.05–1.5 parts by weight non-wetting binding agent, as a powder having a preferred particle size range of about 0.2 to 40 microns; and 0–1.5 parts but preferably 0.5–1.5 parts by weight of a suitably effective catalyst to decompose perhydroxides. Thus, the hydrophilic composite may contain only oxygen absorption/reduction electrocatalyst and binding agent.

To this mixture, a sufficient amount of deionized water is added, to form a material having a paste-like consistency. This paste is then spread over and pressed into a fibrous mesh or other suitable type current collector, to integrate the current collector into a composite structure. This structure is then air dried and pressed at a temperature between about 250°C and 300°C at about 0.25 to 3 tons/sq.in., to form the hydrophilic layer having a thickness of about 5 to 45 mils. The hot pressing step thermally reduces the catalyst, preferably incorporated as $AgNO_3$, to the metal species, silver, and increases the overall electrical conductivity of the plaque by compaction.

The hydrophilic layer is then generally laminated with a layer of hydrophobic material impervious to the electrolyte, but capable of permitting air and oxygen diffusion therethrough. Preferably, the gas permeable, alkaline liquid impermeable hydrophobic layer comprises a combination sheet of porous polytetrafluoroethylene, polypropylene and fluorinated ethylene propylene fibers.

The bifunctional metal/air battery of the present invention comprises at least one bifunctional air electrode as described above having the hydrophobic layer in contact with a source of oxygen such as air. A metal (fuel) electrode made of iron, cadmium, zinc or the like is spaced apart from the air electrode and ionically connected by an alkali hydroxide electrolyte, preferably aqueous KOH.

With reference to FIG. 1, a general representation of one embodiment of the bifunctional cell of the present invention is shown as 10. Metal/air cell 10 includes a casing 11 for support of the air electrode and fuel electrode as well as the electrolyte. Preferably, casing 11 is fabricated from a suitable plastic or other non-conducting material that is stable or resistant to the electrolyte and reaction products, typically oxygen and hydrogen. Cell 10 comprises a pair of air cathodes 12 and 13 each having an outer hydrophobic layer 14 and 16, respectively, each of which is in contact with the atmosphere or other source of air or oxygen. Air electrodes 12 and 13 also include hydrophilic layers 17 and 18, respectively, including integrally molded metal current collectors 19 and 21. Electrodes 12 and 13 are framed in frames 22 and 23, preferably made from styrene-butadiene-acrylontrile plastic and having electrical leads 24 and 26, respectively.

Metal/air cell 10 includes a fuel electrode 27, preferably fabricated from iron, cadmium, zinc or the like material, preferably iron, disposed and spaced between air electrodes 12 and 13 and including electrical lead 28. Metal/air cell 10 also includes an electrolyte 29 between and in contact with metal electrode 27 and air electrodes 12 and 13, respectively. Electrolyte 29 is an alkali hydroxide, preferably potassium hydroxide.

Figure 2:
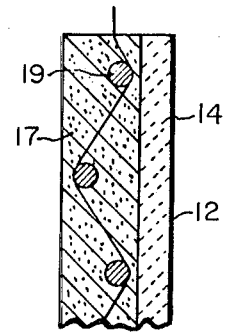
FIG. 2 is an enlarged sectional elevation of the cathode of the present invention.

With reference to FIG. 2, a cathode 12 is shown with hydrophilic layer 17 and hydrophobic layer 14 laminated thereto. Current collector 19 is shown within hydrophilic layer 17 and is adapted for electrical connection to the circuit. In the present invention, the hydrophilic layer is about 5 to 100 mils and preferably about 5 to 45 mils in thickness and the hydrophobic layer is about 5 to 20 mils. Generally, it has been found that the life of an air electrode increases with an increase in the thickness of the hydrophilic layer. However, any increase greater than about 100 mils is undesirable because of the increase in weight to the cell.

With reference again to FIG. 2, as is well known, in the cathode 12 shown, the air penetrates by diffusion to a three phase zone which is a narrow electrochemically active zone where the $O_2$, liquid electrolyte and solid oxygen absorption/reduction electrocatalyst particles meet. The most effective interface is at the current collector 19. The hydrophilic layer is adapted to provide this gas-liquid interface by using an amount of non-wetting binding agent, or by other means, to provide a liquid selectively permeable, gas permeable matrix containing the catalyst system generally distributed uniformly therethrough. The matrix contains sufficient non-wetting binding agents to prevent flooding and effect liquid penetration only a narrow active zone preferably near the current collector, where the liquid will contact $O_2$.

The composition of this invention is spread over and through electronic current collectors 19 and 21, each preferably formed as an array of 1 mil thick nickel or nickel plated steel fibers, sintered together generally below the melting point of the fibers to form a plaque, with a theoretical density of about 5–15% i.e. about 85–95% porous, at a thickness of 10–45 mils. Hydrophobic layers 14 and 16 can comprise a sheet of porous, unsintered, completely fibrillated polytetrafluoroethylene alone or in combination with polymethylmethacrylate and plasticizers such as dialkyl phthalate. Preferably, the hydrophobic layers will comprise a sheet of porous unfibrillated fluorinated ethylene propylene and fibrillated polytetrafluoroethylene and polypropylene fibers. While other methods of attaching hydrophobic layers 14 and 16 to hydrophilic layers 17 and 18 are suitable, it is preferred that they be roll laminated. Both layers can be passed through a two mill wherein the roll surfaces are maintained at a temperature of about 190°C with a pressure therebetween of about 25 psi.

The following non-limiting example is illustrative of various air electrodes and metal/air cells formed therewith utilizing the materials set forth above.

EXAMPLE 1

Two air electrodes were fabricated. Electrode (A) utilized $CaMnO_3$ and Electrode (B) utilized $Ca_{0.8}Na_{0.1}Y_{0.1}MnO_3$, as the oxygen absorption and reduction electrocatalyst. For Electrode (A): 320 mg of powdered spectroscopically pure $CaMnO_3$ was mixed with 60 mg of polytetrafluoroethylene non-wetting binding agent solution, with a spatula to form a paste. For Electrode (B): 320 mg of powdered spectroscopically pure $Ca_{0.8}Na_{0.1}Y_{0.1}MnO_3$ was mixed with 60 mg of polytetrafluoroethylene non-wetting binding agent solution, with a spatula to form a paste. In both cases, no other catalysts were used. In both cases the binding agent solution contained 60 Wt.% solids to provide 0.11 part binding agent per 1 part electrocatalyst; the oxygen absorption and reduction electrocatalysts had surface areas of about 0.5 to 1.0 sq. meters/gram and a particle size range of approximately 0.02 to 0.10 microns.

These two pastes were then each spread into as well as over both sides of 4 sq.cm. sintered, nickel mesh plaque current collectors having thicknesses of about 0.014 inch and approximately 6% theoretical density i.e. 94% porous, to form the hydrophilic composites. The composites were then air dried for about 12 hours to remove moisture. The composites were then molded by flat-bed pressing at 275°C for 10 minutes at 5000 psi, to form hydrophilic layers having thicknesses of about 0.007 inch and containing the electrocatalysts distributed throughout the hydrophilic matrix. A nickel tab was then spot welded to each electrode plaque.

Figure 3:
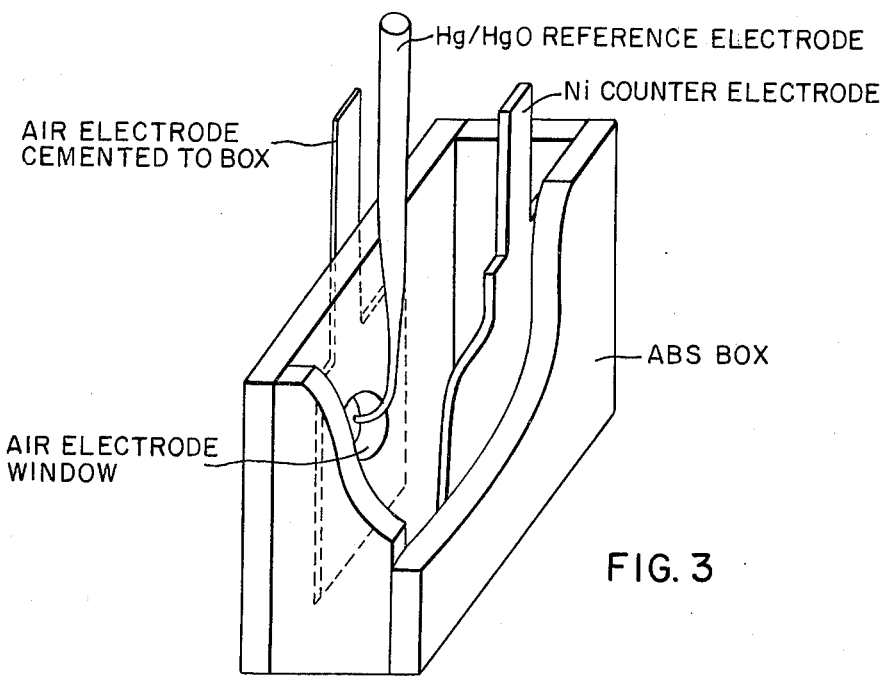
FIG. 3 is a cut away view of the half-cell test assemblies used in the Example.

Two half-cell test assemblies, shown schematically in FIG. 3 of the drawings were constructed. They consisted of a box, 1½ × 1½ × ¾ inches, fabricated by cementing together appropriately shaped pieces of styrene-butadiene-acrylontrile plastic. One side of the boxes was drilled with a hole, 1 cm in diameter as shown. The electrodes were attached to this side with epoxy resin cement. The effective air electrode areas were 0.79 cm². The assemblies were placed in empty 250 ml beakers.

A counter-electrode of sheet-nickel was placed in each box. A curved capillary tip of a Hg/HgO reference electrode was placed so that it touched the inside face of the air electrodes as shown. The boxes were filled with aqueous 25 Wt.% KOH. After stabilization of the open-circuit voltage, the electrodes were operated potentiostatically (PAR Potentiostat 371) at 25°C at −200 mV (Hg/HgO). Potentiostatic testing of the electrodes was employed. As soon as the current stabilized at this potential (1–3 hours), the currents at polarizations from −100 mV to −400 mV (Hg/HgO) were determined for Electrode (A) and Electrode (B) (TABLE 1 below).

Data in the anodic (oxygen-evolution) mode were also taken galvanostatically at 25°C, at currents ranging from 5 through 50 mA (TABLE 2 below). The air electrodes were then returned to the cathodic mode and held once again at −200 mV (Hg/HgO) until the current stabilized. A comparison of these values with the initial current at −200 mV (Hg/HgO) provided a measure of the stability of the materials on cycling (TABLE 2 below).

The air electrodes were then "choked" by filling the beakers, in which the entire half-cell test assemblies were held, with 25 wt.% KOH. If the reaction in the air electrodes is exclusively reduction of the oxygen component of air, the current should ultimately fall to a value which depends on the equilibrium oxygen content of the electrolyte. The rate of fall is a function of the volume of trapped air in the electrode. If the current does not fall to near-zero and stabilizes instead at an intermediate value, the material is functioning partially as an oxide electrode (i.e., it has capacity) and partially as an air electrode. Choking is therefore a simple but very useful technique for isolating the oxygen/reduction properties of the oxides.

Electrode (C) containing only 320 mg acetylene black carbon (Shawinigan, sold by Shawinigan Products Corp.) having a particle size between about 0.02–0.1 microns and a surface area of 60–70 sq. meters/gram and 60 mg polytetrafluoroethylene solution containing 60 Wt.% solids, was fabricated as a comparative electrode, using the same techniques as described above. It was tested similarly to Electrodes (A) and (B). Electrode (D) having the same composition as Electrode (C) but also containing AgNO₃ catalyst, and tungsten carbide with 12% by weight fused Co, was also made and tested similarly to Electrodes (A) and (B), for comparative purposes.

The experimental data for Electrodes (A)–(D), is shown in TABLE 1 and TABLE 2 below:

TABLE 1

| Oxygen Reduction Activity of $CaMnO_3$ and $Ca_{0.8}Na_{0.1}Y_{0.1}MnO_3$ | | | | | |
|---|---|---|---|---|---|
| Sample | $E_{o.c.}$ | Currents at Polarization Relative to Hg/HgO, in mA | | | |
| | mV, Hg/HgO | −100mV | −200mV | −300mV | −400mV |
| Electrode (A) $CaMnO_3$ | 14 | — | 2.82 | 4.30 | 5.80 |
| Electrode (B) $Ca_{0.8}Na_{0.1}Y_{0.1}MnO_3$ | 11 | 0.60 | 1.35 | 2.40 | 4.0 |
| Electrode (C) acetylene black | −22 | 0.06 | 0.45 | 1.10 | 1.90 |
| Electrode (D) acetylene black, Ag and WC-Co | −75 | 0.08 | 0.91 | 2.78 | 6.20 |

This data indicates that these two $MnO_3$ type compounds are highly active in oxygen reduction, are vastly superior to acetylene black alone, and can be as effective an electrode as an acetylene black carbon electrode which also contains WC-Co low oxygen overvoltage material. As can be seen, the $MnO_3$ compounds can be completely substituted for other catalysts and oxygen overvoltage material. Values for Electrodes (A) and (B) should be even better with addition of low oxygen overvoltage materials such as $WS_2$, WC and WC-Co with 1–20 Wt.% Co and with silver catalyst.

TABLE 2

| Oxygen Evolution Activity and Stability of $CaMnO_3$ and $Ca_{0.8}Na_{0.1}Y_{0.1}MnO_3$ | | | | | |
|---|---|---|---|---|---|
| | Polarization Relative to Hg/HgO, mV | | | Cathodic Current at −200 mV vs. Hg/HgO, mA | |
| | 5mA | 20mA | 50mA | before | after |
| Electrode (A) $CaMnO_3$ | 827 | 940 | 1002 | 2.85 | 2.1 |
| Electrode (B) $Ca_{0.8}Na_{0.1}Y_{0.1}MnO_3$ | 594 | 650 | 706 | 1.30 | 0.78 |
| Electrode (C) acetylene black | 581 | 614 | 646 | 0.48 | 0.14 |
| Electrode (D) | 562 | 578 | 588 | 1.40 | 4.7 |

This data indicates that these two $MnO_3$ type compounds are highly active in oxygen evolution and also very stable upon cycling. As can be seen, Electrode (A) was brought 250 mV over +750 mV and Electrode (B) was brought up to 706 mV at 5 mA; yet the cathodic current after completion of the anodic mode remained stable, i.e. the electrodes were still highly active.

Figure 4:
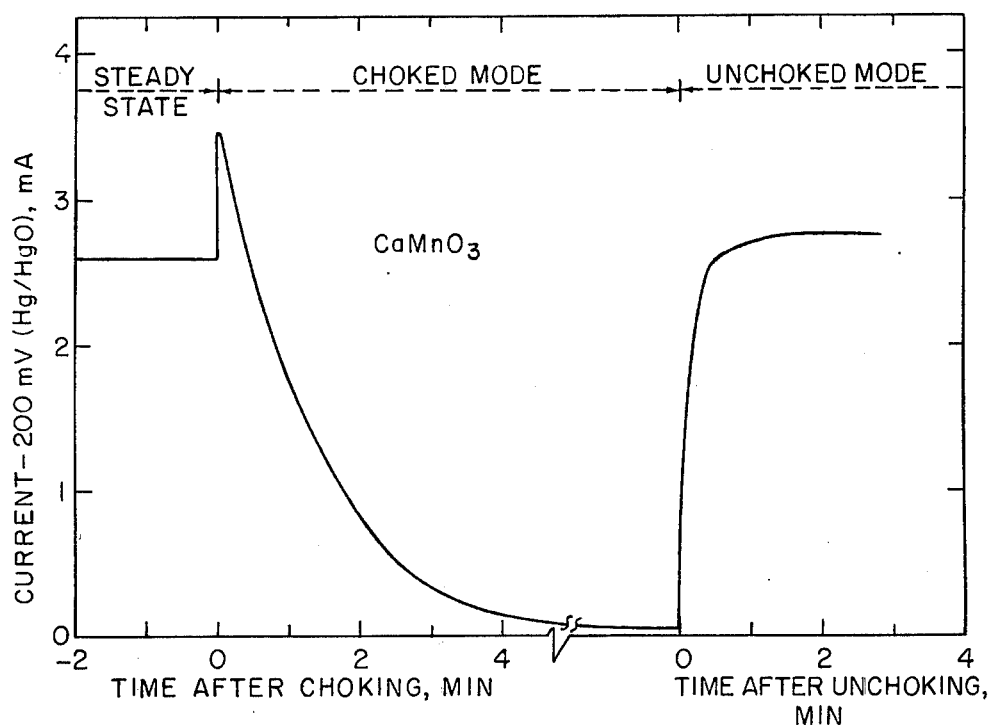
FIG. 4 is a graph showing air electrode performance of one of the electrodes of the Example.

The effects of choking and unchoking on the current-time profile of the $CaMnO_3$ air electrode held at −200 mV (Hg/HgO) is shown in FIG. 4 of the drawings. The sharp drop to near-zero current on choking, approximately 0.05 mA, followed by the rapid almost 100% recovery of the steady-state performance on unchoking, demonstrates that this electrode is functioning solely as an air electrode. Similarly, when Electrode (B) was choked, the current output fell to 0.05 mA followed by rapid recovery indicating performance as an air electrode. The Shawinigan carbon electrodes recover only about 30% of the steady-state value due to apparent irreversible flooding of the active pores of the carbon particles.

The data in TABLE 1 and TABLE 2 indicate excellent electrode stability for electrodes (A) and (B) between +700 to +1000 mV, and −300 mV in KOH at room temperatures. The electrical resistivity of these $CaMnO_3$ and $CaMnO_3$:Na,Y materials should be less than 1000 ohm-cm, and there should be negligible contact resistance with their nickel fiber supports in KOH. The data also indicates that the manganite Electrodes (A) and (B) will function effectively as bifunctional air electrodes in a metal/air battery one type of which is shown in FIG. 1 of the drawings, containing a fuel electrode and air electrodes in contact with air, all electrodes contacting alkali hydroxide electrolyte.

We claim:

1. A gas electrode containing a hydrophilic layer comprising:
   1. a composite adapted to provide a gas-liquid interface therein containing:
      i. an oxygen absorption/reduction electrocatalyst selected from the group consisting of $CaMnO_3$ and $Ca_{(1-x-z)}MnO_3$: $Na_x$, $Y_z$, where $x$ and $z$ can range from about 0.05 to 0.40; and
   2. a metal current collector.

2. A gas electrode as set forth in claim 1 wherein said hydrophilic composite includes for each part by weight of oxygen absorption/reduction electrocatalyst:
   ii. an amount of a bonding/non-wetting agent effective to bond the components together and provide a permeable matrix having a gas-liquid interface therein,
   iii. about 0.1–1.5 parts by weight, based on oxygen absorption/reduction electrocatalyst, of a low oxygen overvoltage material selected from the group consisting of $WS_2$, WC and WC with 1–20 Wt.% Co and mixtures thereof, and
   iv. an effective amount of a catalyst for decomposition of perhydroxides,
and wherein the current collector is a metal fiber current collector.

3. A gas electrode as set forth in claim 2 also containing a hydrophobic layer attached to the hydrophilic layer, said hydrophobic layer comprising a sheet of porous, plastic selected from the group consisting of polytetrafluoroethylene, polypropylene, fluorinated ethylene propylene and mixtures thereof and wherein the bonding/non-wetting agent in the hydrophilic composite contains polytetrafluoroethylene.

4. A gas electrode as set forth in claim 3 wherein said hydrophilic composite is substantially flat and the catalyst for decomposition of perhydroxides is selected from the group consisting of silver, and silver mercury alloys.

5. At least one gas electrode as set forth in claim 3 in a metal/air cell which comprises a metal electrode selected from the group consisting of iron, zinc, and cadmium; the gas electrode spaced apart from said metal electrode, and an alkali hydroxide electrolyte in contact with said metal electrode and the hydrophilic layer of the gas electrode, the gas electrode having the hydrophobic layer in contact with a source of oxygen.

6. An air electrode for use in electrochemical energy cells comprising:
   A. a hydrophilic layer comprising:
      1. a hydrophilic composite comprising:
         i. about 1 part by weight of an oxygen absorption/reduction electrocatalyst selected from the group consisting of $CaMnO_3$ and $Ca_{(1-x-z)}MnO_3$:- $Na_x$,$Y_z$, where $x$ and $z$ can range from about 0.05 to 0.40, having a surface area of from about 0.5–200 sq. meters/gram;
         ii. about 0.1–1.5 parts by weight of low oxygen overvoltage material selected from the group consisting of $WS_2$, WC and WC with 1–20 Wt.% Co. and mixtures thereof; and
         iii. an amount of bonding/non-wetting agent effective to bond the components together and provide a permeable matrix having a gas-liquid interface therein; and
      2. a metal current collector; and
   B. a hydrophobic layer attached to said hydrophilic layer.

7. An air electrode as set forth in claim 6 wherein said hydrophilic composite also includes:
   iv. an effective amount of a catalyst for decomposition of perhydroxides,
and wherein the current collector is a metal fiber current collector.

8. An air electrode as set forth in claim 6 wherein said hydrophobic layer comprises a sheet of porous, plastic selected from the group consisting of polytetrafluoroethylene, polypropylene, fluorinated ethylene propylene and mixtures thereof, and wherein the bonding/non-wetting agent in the hydrophilic composite contains polytetrafluoroethylene.

9. An air electrode as set forth in claim 6 wherein said hydrophilic composite is substantially flat and includes 0.15–1.5 parts by weight of a catalyst for decomposition of perhydroxides selected from the group consisting of silver, and silver mercury alloy.

10. At least one air electrode as set forth in claim 6 in a metal/air battery which comprises a metal electrode selected from the group consisting of iron, zinc, and cadmium; the air electrode spaced apart from said metal electrode, and an alkali hydroxide electrolyte in contact with said metal electrode and the hydrophilic layer of the air electrode, the air electrode having the hydrophobic layer in contact with a source of oxygen.

* * * * *